(12) United States Patent
Geyer et al.

(10) Patent No.: US 9,385,585 B2
(45) Date of Patent: Jul. 5, 2016

(54) METHOD FOR CONTROLLING HARMONICS AND RESONANCES IN AN INVERTER

(71) Applicant: ABB RESEARCH LTD, Zürich (CH)

(72) Inventors: Tobias Geyer, Zürich (CH); Georgios Papafotiou, Allenwinden (CH); Silvia Mastellone, Gebenstorf (CH)

(73) Assignee: ABB Research Ltd., Zurich (CH)

( * ) Notice: Subject to any disclaimer, the term of this patent is extended or adjusted under 35 U.S.C. 154(b) by 291 days.

(21) Appl. No.: 14/155,943

(22) Filed: Jan. 15, 2014

(65) Prior Publication Data

US 2014/0126252 A1    May 8, 2014

Related U.S. Application Data

(63) Continuation of application No. PCT/EP2012/062706, filed on Jun. 29, 2012.

(30) Foreign Application Priority Data

Jul. 15, 2011   (EP) .................................... 11174123

(51) Int. Cl.
| | |
|---|---|
| *H02M 1/12* | (2006.01) |
| *H02M 7/487* | (2007.01) |
| *H02M 7/5395* | (2006.01) |

(Continued)

(52) U.S. Cl.
CPC ................ *H02M 1/12* (2013.01); *H02M 7/487* (2013.01); *H02M 7/5395* (2013.01); *H02P 23/30* (2016.02); *H02P 27/06* (2013.01); *G05B 19/0421* (2013.01); *H02M 2007/53876* (2013.01); *H02P 21/30* (2016.02)

(58) Field of Classification Search
USPC .......... 363/41, 56.01, 56.02, 95, 97, 131, 132
See application file for complete search history.

(56) References Cited

U.S. PATENT DOCUMENTS

| | | | |
|---|---|---|---|
| 5,648,705 A | * | 7/1997 | Sitar ......................... H02P 9/48 318/145 |
| 7,256,561 B2 | | 8/2007 | Geyer et al. |

(Continued)

FOREIGN PATENT DOCUMENTS

| | | |
|---|---|---|
| EP | 1 670 135 A1 | 6/2006 |
| WO | WO 2011/032581 A1 | 3/2011 |

OTHER PUBLICATIONS

International Search Report (PCT/ISA/210) mailed on Dec. 21, 2012, by the European Patent Office as the International Searching Authority for International Application No. PCT/EP2012/062706.

(Continued)

*Primary Examiner* — Timothy J Dole
*Assistant Examiner* — Bryan R Perez
(74) *Attorney, Agent, or Firm* — Taft Stettinius & Hollister LLP

(57) ABSTRACT

In a method based on the MPDTC algorithm for controlling an inverter of an electrical system, the harmonics and resonances in the inverter can be damped by extracting frequency information from predicted data of the MPDTC algorithm and by damping harmonic distortion of the electrical system by reintroducing the extracted frequency information into a control loop of the inverter.

20 Claims, 2 Drawing Sheets

(51) Int. Cl.
*G05B 15/00* (2006.01)
*H02P 27/06* (2006.01)
*G05B 19/042* (2006.01)
*H02M 7/5387* (2007.01)

(56) References Cited

U.S. PATENT DOCUMENTS

| | | | | |
|---|---|---|---|---|
| 7,317,998 | B2* | 1/2008 | Lacaze | H02M 5/293 363/152 |
| 2006/0125435 | A1* | 6/2006 | Geyer | H02P 23/004 318/400.02 |
| 2008/0112200 | A1* | 5/2008 | Tan | H02M 7/487 363/101 |
| 2008/0130332 | A1* | 6/2008 | Taimela | H02J 9/062 363/95 |
| 2009/0201703 | A1* | 8/2009 | Klikic | H02J 9/062 363/41 |
| 2010/0134053 | A1* | 6/2010 | Yamada | H02M 7/53875 318/162 |
| 2011/0115532 | A1* | 5/2011 | Roesner | H02M 7/487 327/136 |

OTHER PUBLICATIONS

Written Opinion (PCT/ISA/237) mailed on Dec. 21, 2012, by the European Patent Office as the International Searching Authority for International Application No. PCT/EP2012/062706.

Hu Hu et al., "Predictive direct torque control strategies of induction motor based on area voltage vectors table", vol. 3, Nov. 2, 2003, pp. 2684-2689.

Noguchi et al., "High frequency switching operation of PWM inverter for irect torque control of induction motor", vol. 1, Oct. 5, 1997, pp. 775-780.

* cited by examiner

METHOD FOR CONTROLLING HARMONICS AND RESONANCES IN AN INVERTER

RELATED APPLICATION

This application claims priority as a continuation application under 35 U.S.C. §120 to PCT/EP2012/062706, which was filed as an International Application on Jun. 29, 2012 designating the U.S., and which claims priority to European Application 11174123.7 filed in Europe on Jul. 15, 2011. The entire contents of these applications are hereby incorporated by reference in their entireties.

FIELD

The present disclosure relates to the field of high power inverters, such as method and a program element for controlling an inverter, a computer-readable medium, a controller of an inverter and an inverter.

BACKGROUND INFORMATION

Electrical inverters may be used for transforming an input voltage into an output AC voltage. For example, the AC voltage from an electrical grid may be transformed into a variable AC voltage supplied to an electrical drive or another AC voltage to be supplied to another electrical grid.

For generating the usual multi-phase output voltage, the inverter can include a plurality of semiconductor switches, for example thyristors or IGCTs, which may be controlled by an electronic controller of the inverter.

One possibility of controlling an inverter is direct torque control (DTC). In DTC the torque and the flux of the electrical drive may be controlled by estimating the actual torque and the actual flux form measured voltages and currents that are output from the inverter, and selecting a switching state for the switches of the inverter in such a way that the actual flux and actual torque move towards a reference flux and a reference torque, when the switching state is applied to the inverter switches.

However, one of the drawbacks of DTC may be the fact that the average switching frequency of the inverter cannot be directly controlled. Since the switching frequency can be proportionally related to the switching losses of the inverter, which may be a major part of the overall losses of the electrical drive, any reduction of the switching frequency may have a significant impact on the operational cost of the drive and increase the overall system robustness and reliability.

Such a reduction has been shown to be possible through the Model Predictive Direct Torque Control (MPDTC) method, which, for example, is described in EP 1 670 135 A1. In MPDTC, possible sequences of switching states are determined, which may be applied to the inverter switches in the future. These switching sequences may be constrained by the actual switching state of the inverter and the inverter topology. Since two different switching states may result in the same output phase voltages (i.e., the same voltage vector) possible voltage vector sequences may be considered that include a sequence of voltage vectors. For each possible switching sequences or voltage vector sequence, the switching losses are estimated and the first switching state of the switching sequence is applied to the motor.

For achieving a more drive friendly voltage supply, it is possible to place a harmonic filter, for example an LC filter, between the inverter and the electrical drive. Such a filter may smooth out the effects of irregular switching actions of DTC, which may lower the harmonic distortion of the motor currents.

However, in this case, the introduction of the harmonic filter may render drive quantities, like flux and torque, not directly controllable. Specifically, it is no longer possible to directly and rapidly manipulate the stator flux by the application of a specific voltage vector, since what is applied to the motor terminals is the voltage of the capacitor of the LC filter, which features much slower dynamics, and is not immediately affected by the applied voltage vector. This implies that the control objective of producing the desired torque by the suitable and rapid positioning of the stator flux vector is no longer attainable.

To address this issue with DTC, one solution is to modify the control problem and target the control of certain inverter (instead of motor) variables. Namely, the notions of the inverter flux and inverter torque are introduced; the first being the integral over time of the inverter voltage, and the second expressing the interaction of the inverter flux and the inverter currents. These two variables are different from the actual corresponding motor flux and torque (especially during transients) but their average values at steady state are the same. Those virtual notions are the electric equivalent of the motor torque and flux though they do not correspond to physical quantities. The advantage of introducing and working with such quantities is that they can be directly and quickly manipulated by the application of the proper voltage vector. These features imply that the DTC problem can be recast as an inverter control problem, where the objective is to keep the inverter flux and torque within certain bounds. The physical properties of the system then assure that the motor will also reach the appropriate steady state conditions.

SUMMARY

A method is disclosed for controlling the harmonics and resonances in an inverter for an electrical system, the method comprising: determining possible voltage vector sequences that may be generated by the inverter by switching switches of the inverter and that may be supplied to the electrical system; determining candidate sequences from the possible voltage vector sequences by estimating system response data for each voltage vector sequence and by keeping voltage vector sequences with admissible system response data; determining a cost value for each candidate sequence, wherein each cost value is based on predicted switching losses of the inverter when switched with the candidate sequence; applying a first voltage vector of a candidate sequence with a lowest cost value to the inverter; extracting frequency information from predicted data, the predicted data including data of at least one of the possible voltage vector sequence and/or system response data; and damping harmonic distortion of the electrical system by reintroducing the extracted frequency information into a control loop of the inverter.

BRIEF DESCRIPTION OF THE DRAWINGS

The subject matter of the invention will be explained in more detail in the following text with reference to exemplary embodiments which are illustrated in the attached drawings, wherein.

The reference symbols used in the drawings, and their meanings, are listed in summary form in the list of reference symbols. In principle, identical parts are provided with the same reference symbols in the figures.

DETAILED DESCRIPTION

Figure 1:
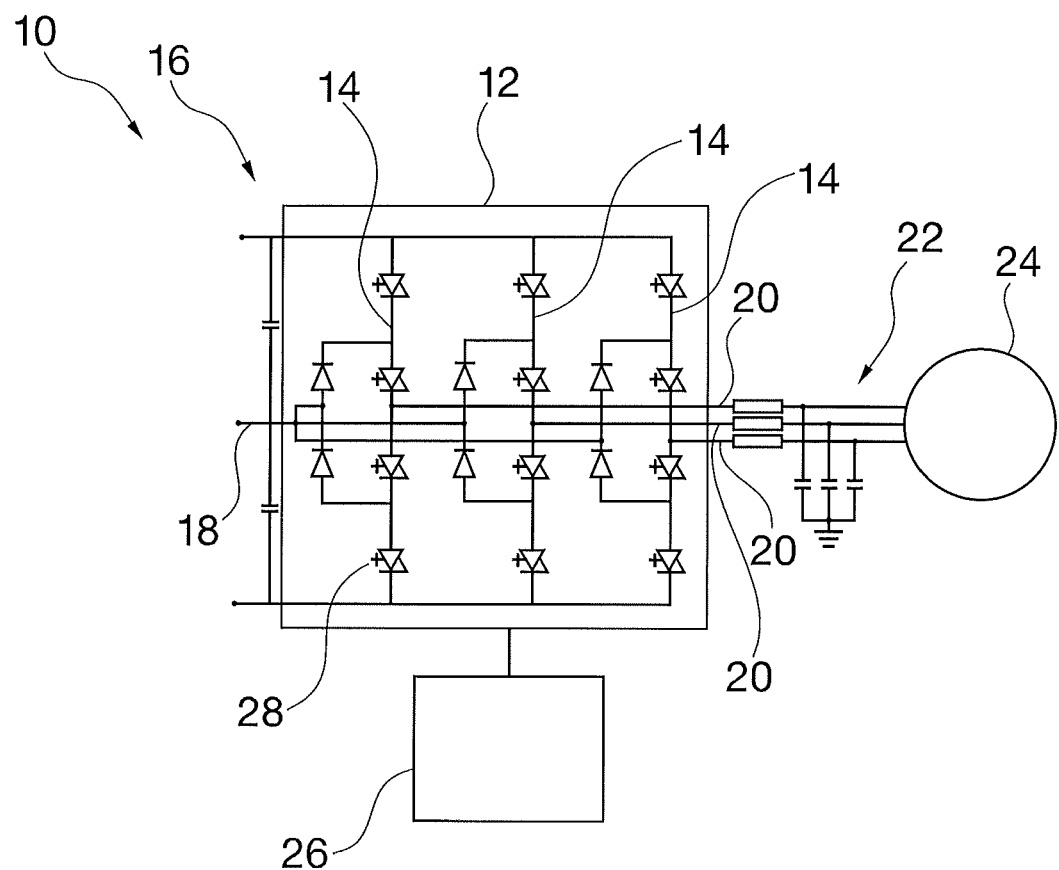
FIG. 1 schematically shows an inverter according to an exemplary embodiment disclosed herein.

When a harmonic filter is introduced, a frequency decoupling should be maintained to avoid the emergence of unwanted harmonics in the current and torque of the drive. Specifically, since the resonance frequency of the harmonic filter might interfere with the switching frequency, it is desirable to set the latter such as to preserve a frequency decoupling. Therefore, simple minimization of the switching frequency may not longer be used as a way to indirectly affect the switching losses as was the case with the above mentioned MPDTC algorithms.

Further issues can include the presence of electrical and mechanical resonances that can alter the inverter performance.

Issues with the torque and current harmonics may arise for example, below 10% and 20% of the maximal speed of the drive. Such distortions can be characterized by the presence of a $6^{th}$ harmonic in the drive and inverter torques and $5^{th}$ and $7^{th}$ harmonics in the inverter currents and phase voltages. The $5^{th}$ and $7^{th}$ harmonics are generated by the switching and then transferred to the inverter current. The distortion can appear as a $6^{th}$ harmonic on the inverter and motor torque.

Another, yet related issue may be the following: The mechanical load can be connected via a rotational shaft with the drive. In medium voltage drive applications the inertia of the mechanical load can be very large and the shaft can be fairly long and stiff. Such applications include large compressor trains, which can be found in the oil and gas industry. In the very high power range, the electrical machine acts as a starter and helper motor, while the majority of the power is provided by a gas turbine that is also connected to the shaft. In such applications the mechanical system formed by the load, gas turbine, electrical machine and shaft exhibits distinctive torsional resonant modes. The natural frequencies of these torsional modes can range from a few Hz to up to several hundred Hz. The amplification factor (the so called Q factor) is often 40 and more.

The inverter of medium voltage drives can employ a low switching frequency giving rise to pronounced torque harmonics. If such a torque harmonic coincides with a natural frequency of the mechanical system large mechanical torsional vibrations can occur. This issue of mechanical resonances may be directly related to the former problem with electrical resonances, in the sense that the same damping principles can be employed. The main difference is that the mechanical resonances can have a lower natural frequency than the electrical phenomena.

An MPDTC controlled inverter is disclosed herein with low switching losses and low harmonic distortion.

An exemplary method is disclosed for controlling the harmonics and resonances in an inverter. The inverter may be a three-phase, three-level inverter for driving an electrical motor. The electrical system may be a high or medium voltage system. The method may be part of a on the Model Predictive Direct Torque Control (MPDTC) algorithm, for example, for the control of a three-phase induction motor comprising a three-level dc-link inverter with an output LC filter. In such a way, the method may be adapted for controlling an inverter for an electrical system.

According to an exemplary embodiment disclosed herein, inverter torque predictions of the MPDTC algorithm are filtered and added to the compensation term of the reference torque. This compensation enables to reduce the harmonic distortion at low speed while preserving the achieved losses reduction in all the operating range. For example, harmonic distortion that is present in the torque at low speeds (10% and 20%) may be handled in this way.

According to an exemplary embodiment disclosed herein, predicted possible voltage vector sequences of the MPDTC algorithm are discarded, when the predicted harmonic distortion is above a predefined value. Already at the MPDTC control decision level, the voltage vector sequences that produce minimal harmonics may be chosen and the other voltage vector sequences may be discarded.

Summarized, exemplary embodiments as described herein for damping harmonics are based on using the MPDTC predictions to extract information about the frequency content that is about to be introduced into the electrical system by the actions of the control algorithm. These embodiments may not have to replace standard state-of-the art active damping, but may act as additional compensation to handle the harmonic distortion that the standard compensation cannot address. Moreover, these embodiments may not interfere with the performance of MPDTC in terms of switching losses reductions.

According to an exemplary embodiment disclosed herein, a method can include: (a) determining possible voltage vector sequences that may be generated by the inverter by switching switches of the inverter and that may be supplied to the electrical system. In MPDTC, with a discrete-time algorithm possible time sequences of switching states may be determined, which may be applied to the inverter switches in the future. Since two different switching states may result in the same output phase voltages (i.e., the same voltage vector) possible voltage vector sequences may be considered that include a time sequence of voltage vectors. In a three-phase system a voltage vector may include three voltage values. A voltage vector sequence can be determined over a time horizon of 2 or three steps (i.e., time instants).

According to an exemplary embodiment, a method can include: (b) determining of candidate sequences from the possible voltage vector sequences by estimating system response data for each voltage vector sequence and by keeping voltage vector sequences with admissible system response data. The system response data may include the inverter torque, the inverter flux and neutral point potentials. For example, trajectories of these values may be estimated over the horizon. In general, a system response data may be estimated by estimating a trajectory of a system response value from a possible voltage vector sequence, for example a torque or flux trajectory. A possible voltage vector sequence may admissible, if the corresponding estimated trajectory is lying within bounds or the estimated trajectory approaches the bounds that are based on a reference value. The system response value may include a predicted torque, a predicted flux, and/or a predicted neutral point potential of the inverter and the reference value can include a reference torque, a reference flux and/or a reference neutral point potential.

According to an exemplary embodiment disclosed herein, a method can include: (c) determining a cost value for each candidate sequence, wherein the cost value is based on predicted switching losses of the inverter when switched with the candidate sequence.

According to an exemplary embodiment disclosed herein, a method can include: (d) applying a first voltage vector of a candidate sequence with the lowest cost value to the inverter. Not the whole sequence but only the first element may be applied to the inverter.

According to an exemplary embodiment disclosed herein, a method can include: (e) extracting frequency information from predicted data, the predicted data including, for example, data of at least one of the possible voltage vector sequence and/or system response data. For example, as already mentioned the frequency information may include data about the $6^{th}$ harmonic distortion of the inverter torque. The at least one of the possible voltage vector sequences may be, for example, all possible voltage vector sequences, at least one and/or all candidate sequences and/or the candidate sequence with the lowest cost value.

According to an exemplary embodiment disclosed herein, a method can include: (f) damping harmonic distortion of the electrical system by reintroducing the extracted frequency information into a control loop of the inverter. As already mentioned, the extracted frequency information may be used to discard specific voltage vector sequences and/or to alter reference values that are used for determining, if a voltage vector sequence is admissible or not.

According to an exemplary embodiment, in step (e) a harmonic distortion of a phase voltage can be determined by extracting frequency information from voltage values associated with a voltage vector sequence. The voltage values may include voltage values of past sampling times and of future sampling times. For example, phase voltage differences are calculated and filtered to calculate a value, which contains frequency information about a frequency band or range of a sequence of phase voltage differences. In this case, step (f) is executed by discarding the voltage vector sequence, when the harmonic distortion (i.e. the value) of the phase voltage leaves predefined bounds.

According to an exemplary embodiment, in step (e) a harmonic distortion of a predicted torque is determined, in step (f) a reference torque is modified with the harmonic distortion of the torque, and in step (b) admissible system response data is determined with bounds based on the reference torque. For example, a correction value may be added to the original reference for obtaining a modified reference torque. The reference value may be determined by applying a filter to the torque trajectory corresponding to the voltage vector sequence which first element is applied to the inverter.

According to an exemplary embodiment, in step (e) a harmonic distortion is determined from the predicted data by applying a digital filter to the predicted data for extracting frequency information. Formulas for a digital filter are given with respect to the description of FIG. 2. The digital filter may be a high-pass or band-pass filter, which may be adjusted by coefficients in the formulas.

According to an exemplary embodiment, in step (e) a sliding discrete Fourier transformation may be applied to the predicted data for extracting frequency information. For example, with a Goertzel algorithm a specific frequency component of the predicted data may be extracted very efficiently.

According to an exemplary embodiment, the frequency information being extracted in step (e) at least contains the frequency information of the harmonic distortion which is to be damped.

A further aspect of the invention relates to program element or computer program for controlling an inverter, which when being executed by at least one processor is adapted for executing the steps of the method as described herein.

A further exemplary aspect relates to a non-transitory computer-readable medium, in which such a program element is stored. A computer-readable medium may be a floppy disk, a hard disk, an USB (Universal Serial Bus) storage device, a RAM (Random Access Memory), a ROM (Read Only memory), a FLASH and an EPROM (Erasable Programmable Read Only Memory). A computer readable medium may also be a data communication network (e.g., the Internet) which allows downloading a program code.

A further exemplary aspect relates to a controller for controlling an inverter. The controller is adapted for executing the method as described herein. For example, the controller may be an FPGA.

A further exemplary aspect relates to an inverter for supplying a load with an AC voltage. The inverter may include an inverter circuit with switches, the inverter circuit being adapted for generating an AC output voltage for at least one phase, a filter circuit interconnected between the inverter circuit and the load, and a controller for controlling the switches. The controller is adapted for executing the method as described herein, thus being adapted for compensating harmonic distortion of the AC voltage.

Features of the method described herein may be features of the program element, the controller and the inverter as described herein and vice versa.

If technically possible but not explicitly mentioned, also combinations of embodiments described herein be embodiments of method, the program element, the controller and the inverter.

These and other aspects of the invention will be apparent from and elucidated with reference to the embodiments described hereinafter with respect to the Figures.

FIG. 1 shows an exemplary embodiment of an inverter 10 with an inverter unit 12 with three inverter legs 14. The inverter legs 14 are connected parallel to a DC link 16 and are adapted to transform a DC voltage from the DC link 16 into a phase 20 of the variable output voltage of the inverter 10. Each inverter leg 14 is adapted to connect the output phase 20 with the positive or negative voltage in the DC link or the neutral voltage in the neutral point 18.

In such a way a three-phase, three level output voltage is provided to the drive 24 which is connected over a LC filter 22 with the inverter unit 12.

The inverter 10 can include a controller 26 which is adapted to control the switches 28 in the inverter legs 14 and to measure the currents and voltages in the output phases 20 and the neutral point potential in the neutral point 18.

In the controller 26, the MPDTC control algorithm is implemented, for example on a FPGA. For example, the inverter 10 may be an ACS6000 or ACS1000 designed by ABB.

Figure 2:
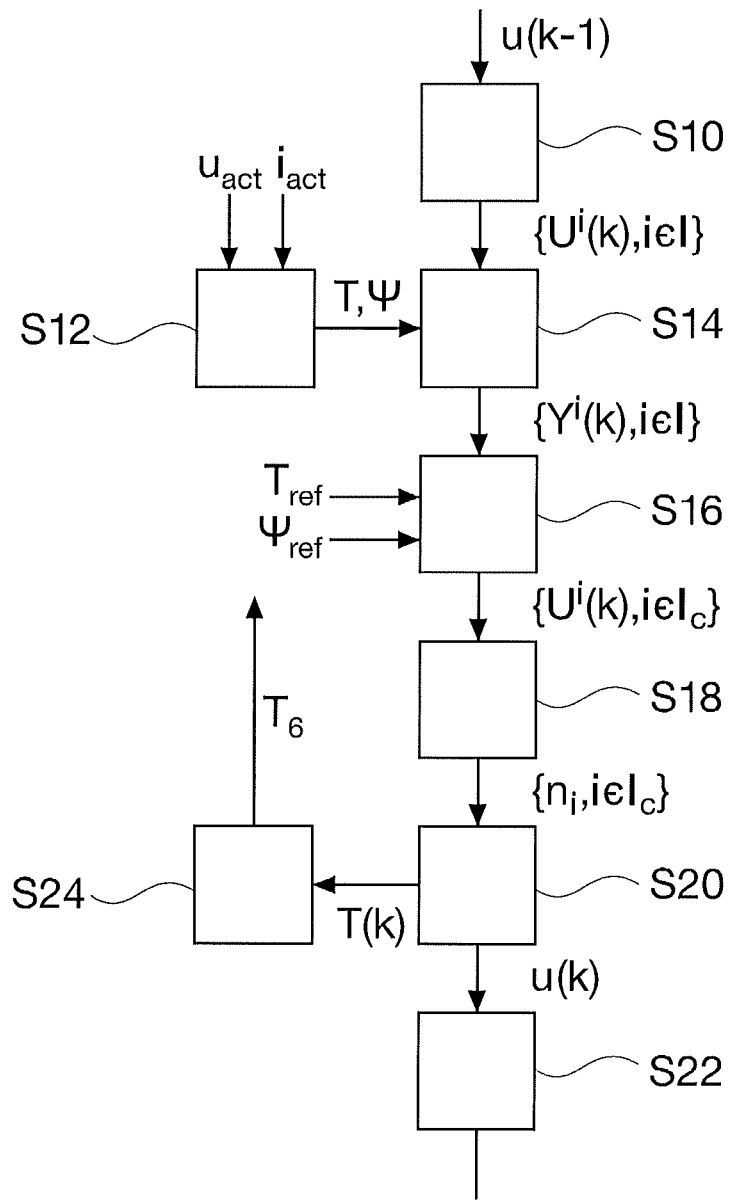
FIG. 2 shows a flow diagram with an MPDTC algorithm according to an exemplary embodiment disclosed herein.

FIG. 2 shows an exemplary flow diagram with an MPDTC algorithm that may be implemented in the controller 10.

Considering the dynamical model of the drive 24, inverter unit 12 and LC filter 22, the state vector may be denoted by $x=[i_{inv}, v_c, \Psi_{inv}, i_{stat}, v_n]$, which includes the inverter current $i_{inv}$, the capacitor voltage $v_c$, inverter flux $\Psi_{inv}$, stator current $i_{stat}$ and neutral point potential $v_n$. The output vector may be denoted by $y=[T_{inv}, \Psi_{inv}, v_n]$ including inverter torque $T_{inv}$, inverter flux $\Psi_{inv}$ and neutral point potential $v_n$ respectively. The data of the state vector x and of the output vector y are the system response data. In the controller the discrete time version of the dynamical model is implemented and the signals $i_{inv}, v_c, T_{inv}, \Psi_{inv}, i_{stat}, v_n$ are represented as discrete function depending on discrete time steps k, i.e. $i_{inv}(k), v_c(k), T_{inv}(k), \Psi_{inv}(k), i_{stat}(k), v_n(k)$, where k is an integer number Given the current state x(k), the last voltage vector u(k−1), the bounds on the controlled variables, and using the discrete-time model of the DTC drive, the controller 26 computes at time-instant k the voltage vector u(k) according to the following procedure.

In step S10, the last voltage vector u(k−1) that was applied to the switches 28 of the inverter unit 12 is used for calculating the possible voltage vector sequences $U^i(k) = [u^i(k), u^i(k+1), \ldots, u^i(k+N_H-1)]$, where $i \in I$ and $I$ is the index set of the possible voltage vector sequences. The possible voltage vector sequences are determined by taking into account the constraints on the switch transitions induced by the inverter topology. For example, all possible voltage vector sequences $U^i(k)$ over a horizon $N_H$ of $N_H = 2$ steps are determined.

In step S12, the actual inverter flux and the actual inverter torque T are determined from an inverter model and the actual voltages and currents measured in the inverter 10.

In step S14, for the possible voltage vector sequences $U^i(k)$, the system response is calculated. For example, the open-loop inverter torque $T_{inv}$, flux $\Psi_{inv}$ and neutral point potential $v_n$ trajectories $Y^i(k)$ are calculated starting from $x(k)$ over the horizon $N_H$, for $N_H = 2$ given by $Y^i(k) = [y^i(k), y^i(k+1), y^i(k+2)]$.

In step S16, the candidate sequences $U^i(k)$ with $i \in I_c \subseteq I$ are determined. The candidate sequences are those possible voltage vector sequences that have output trajectories $Y^i(k)$ that are either feasible at the end of the horizon or pointing in the proper direction for all time-steps within the horizon.

Feasibility means that the trajectory of the controlled variable $\Psi_{inv}$, $T_{inv}$, $v_n$ lies within its corresponding bounds at time-step k to $k+N_H$. Pointing in the proper direction means that the trajectory of the controlled variable $\Psi_{inv}$, $T_{inv}$, $v_n$ is not necessarily feasible, but the degree of the violation is decreasing for all time-steps within the prediction horizon, which means for the time steps k to $k+N_H$. In other words, the trajectory is pointing towards the bounds.

The bounds of the controlled variables $\Psi_{inv}$, $T_{inv}$, $v_n$ depend on the corresponding reference values $\Psi_{ref}$, $T_{ref}$, which are supplied to the controller 10, for example by a speed measurement of the drive 10, or which may be preset, for example, for a drive with constant speed. The controlled variable $v_n$ should be controlled to be zero ($v_n = 0$) or within a predefined range around zero.

The condition applied in step S16 can be such that it will hold component wise (e.g., for all three controlled variables $\Psi_{inv}$, $T_{inv}$, $v_n$). As an example, consider the following situation: the inverter torque $T_{inv}$ is feasible, the inverter flux $\Psi_{inv}$ points in the proper direction, and the neutral point potential $v_n$ is feasible.

In step S18, for the candidate sequences, the output trajectories $Y^i(k)$ are extrapolated in excess of the horizon. For the given example of $N_H = 2$, $Y^i(k)$ are extrapolated from time-instant $k+2$ on linearly using the samples at $k+1$ and $k+2$. Alternatively the extrapolation could also be non-linear. The number of the extrapolation time-steps is derived when the first of the three output variables $\Psi_{inv}$, $T_{inv}$, $v_n$ leaves the feasible region in between of the corresponding upper and lower bound. In this way for each candidate sequence $U^i(k)$, the time step k at which at least one of controlled variables is not feasible any longer. From the time step k, the number of extrapolation time-steps $n_i$, $n_i$, $i \in I_c$ before the next predicted switching can be determined.

In step S20, for each candidate sequence the cost are calculated that approximates the average switching losses by the number of switch transitions weighted with respect to each semiconductor switch and the current through it over the number of time-steps in each of the i candidate sequence can be applied before switching again. The number of time-steps $n_i$ can be interpreted as a time-varying horizon. Next, the sequence $U^i(k)$ with the minimum cost is chosen.

In step S22, the first voltage vector $u^i(k)$ of the chosen sequence $U^i(k)$ is applied to the inverter switches. At the next time-instant the algorithm starts again.

To compensate harmonic distortions, for example, the above mentioned $6^{th}$ harmonic in the torque and/or the low-frequency mechanical resonances, the control algorithm may be supplemented in the following ways. The following exemplary embodiments are described with respect to the damping of the $6^{th}$ harmonic; however they may be also applied to damping of low-frequency mechanical resonances or in general to all kinds of harmonic distortions.

The first embodiment directly tackles the $6^{th}$ harmonic in the torque. The predictions of the inverter torque $T_{inv}(k)$ (T(k) in FIG. 2) provide possible time-evolutions that the system can follow, depending on the selection of the optimal vector u(k) by MPDTC.

In step S24, the predicted torque sequence $T_{inv}(k)$, k=0, 1, 2, is filtered through a high pass filter with cutoff frequency at approximately 30 Hz to retain the $6^{th}$ and higher order harmonics $$\hat{T}_{inv6}(k) = \sum_{i=0}^{N} a_i \hat{T}_{inv}(k) + b_i \hat{T}_{inv6}(k-1-i)$$

where $a_i$, $b_i$ are the filter coefficients which define the frequency band of the filter, i.e. the range in which a frequency is not or nearly not damped by the filter. N is the length of the filtered signal. For a high pass filter, the filter coefficients may be chosen such that the upper bound of the frequency band is higher than the frequencies the discrete time algorithm can resolve.

The value or signal $\hat{T}_{inv6}(k)$ contains the information about the undesired harmonics that will be produced in the torque $T_{inv}(k)$ by the chosen input vector u(k). Depending on the voltage vector sequence U(k) that the MPDTC algorithm selects as the best option to minimize the losses, the corresponding signal $\hat{T}_{inv6}(k)$, describing the harmonic content that the controller's actions will be introducing to the torque, is added to the reference of the inverter torque $T_{ref}(k)$, to produce the new or altered reference torque:

$$T'_{ref}(k) = T_{ref}(k) + \hat{T}_{inv6}(k)$$

Introducing the filter may also improve the harmonic content at higher speeds, but in some cases may decrease the performances in terms of losses, due to the introduction of excessive oscillations in the hysteresis bounds.

Alternatively, a band-pass filter may be considered. For example, the frequency band of the filter may be set to comprise the $6^{th}$ harmonic of the inverter torque (i.e., the frequency of the drive). The result in such a case is the elimination of the harmonics problem at low speed, but for this case the filter may need to be tuned separately for each specific speed, which may be impractical for a drive with variable speed.

The first exemplary embodiment is based on the idea of predicting the harmonics that will be introduced in the torque $T_{inv}(k)$ by the selected switching signal u(k) and compensate the reference signal $T_{ref}$ to cancel out such harmonics.

According to a second exemplary embodiment, already at the MPDTC control decision level, the voltage vector sequences $U^i(k)$ that produce minimal harmonics are chosen. The second embodiment addresses the problem at its source, by constraining the voltage vector sequences $U^i(k)$ to avoid the 5th and 7th harmonic in the switching phase voltages.

This is done in the MPDTC algorithm by introducing the harmonic content of the input voltages as three (one per phase) additional variables $v^j_{57}(k)$, $j=1, 2, 3$ that are controlled together with the inverter flux $\Psi$ and torque T. The variables $v^j_{57}(k)$ contain frequency information of a possible voltage vector sequence $U^i(k)$.

Specifically, in step S16, using the history of the converter voltages $u^i(k)$, $u(k-1)$, ..., $u(k-p)$ during (a few) past sampling times p and the future possible sequences of voltage vectors $U^i(k)$ over the prediction horizon that the MPDTC considers as options, the phase voltage differences $v^j(k)=u^i(k)-u^i(k)$, i, j=1, 2, 3 are filtered across a Nth order filter to capture the 5th and 7th harmonic signals of the phase voltages as follows:

$$v^j_{57}(k) = \sum_{i=0}^{N} a_i v^j(k) + b_i v^j_{57}(k-1-i)$$

where, as before, $a_i$, $b_i$ are the filter coefficients which define the frequency band of the filter. Once obtained, the variables $v^j_{57}(k)$, j=1, 2, 3 become part of the control problem, and the MPDTC algorithm tries to keep them within pre-specified bounds (in the same way that inverter torque T and flux $\Psi$ are also kept within their respective bounds), thus minimizing the effect of these harmonics on the system's behavior.

Summarized, in the second embodiment, a phase voltage difference sequence $v^j(k)$ is calculated from a possible voltage vector sequence $U^i(k)$ and a frequency information value $v^j_{57}(k)$ is extracted from the phase voltage difference sequence. The harmonic distortion of the electrical system is damped by keeping those voltage vector sequences $U^i(k)$ which frequency information value $v^j_{57}(k)$ is within pre-defined bounds.

Similar to the first embodiment, in the second embodiment a high pass filter or a band pass filter may be used.

Instead of using the high- or band pass filters that are applied in the first and second embodiment, the spectral information may also be obtained by using a Sliding Discrete Fourier Transformation (SDFT). The SDFT's main advantage may be its computational efficiency and simple implementation. In the case of the setting considered here we are interested in obtaining the harmonic content for the torque, current or phase voltage differences. Consider a discrete-time signal x (inverter torque, current or phase voltage difference) at time-step k that we wish to analyze over a certain length in time using a fixed-length window with N samples (N can be the length of the filtered signal).

$$x(k)=\{x(k-N+1), x(k-N+2), \ldots, x(k-1), x(k)\}$$

For example, $x(k)$ may be the inverter torque $T(k)$ or the phase voltage difference $v^j(k)$.

Assume that the sampling interval is $T_s$. $NT_s$ could be, for example, equal to the length of one fundamental period. Performing an N-DFT operation on $x(k)$ yields the Fourier transformed discrete-time signal:

$$X(k)=\{X_0(k), X_1(k), \ldots, X_{N-2}(k), X_{N-1}(k)\}$$

Here, we are interested only in certain specific harmonics, say in the n-th value of $X(k)$, ie $X_n(k)$.

Instead of computing the whole spectrum $X(k)$ using an FFT, the Goertzel algorithm can be used to compute isolated $X_n(k)$. We also observe that at two successive time-steps k-1 and k, the windowed sequences $x(k-1)$ and $x(k)$ substantially contain the same elements. In such a sliding window scenario the information computed at the previous time-step k-1 can be used to drastically reduce the computational effort at time-step k.

Specifically, assume that at k-1 $X_n(k-1)$ was computed. Then, it can be shown that the spectrum of the shifted time-sequence at time-step k is given by:

$$X_n(k)=[X_n(k-1)-x(k-N)+x(k)]e^{j2\pi n/N}$$

This implies that regardless of the window length N, the SDFT involves a constant number of operations to compute a successive DFT, namely two real additions and a complex multiplication. Note that this computation assumes that the DFT of the previous time-step is available.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 10 inverter
12 inverter unit
14 inverter leg
16 DC link
18 neutral point
20 output phase
22 LC filter
24 drive
26 controller
28 switch

The invention claimed is:

1. A method for controlling the harmonics and resonances in an inverter for an electrical system, the method comprising:
   (a) determining possible voltage vector sequences that may be generated by the inverter by switching switches of the inverter and that may be supplied to the electrical system;
   (b) determining candidate sequences from the possible voltage vector sequences by estimating system response data for each voltage vector sequence and by keeping voltage vector sequences with admissible system response data;
   (c) determining a cost value for each candidate sequence, wherein each cost value is based on predicted switching losses of the inverter when switched with the candidate sequence;
   (d) applying a first voltage vector of a candidate sequence with a lowest cost value to the inverter;

(e) extracting frequency information from predicted data, the predicted data including data of at least one of the possible voltage vector sequence and system response data; and (f) damping harmonic distortion of the electrical system by reintroducing the extracted frequency information into a control loop of the inverter.

2. The method of claim 1, wherein step (e) comprises:
determining a harmonic distortion of a phase voltage by extracting frequency information from voltage values associated with a voltage vector sequence, and wherein step (f) comprises:
discarding the voltage vector sequence when the harmonic distortion of the phase voltage leaves predefined bounds.

3. The method of claim 1, wherein the voltage values comprise voltage values prior to current sampling times and of future sampling times predicted after the current sampling times.

4. The method of claim 1, wherein step (b) comprises:
estimating system response data by estimating a trajectory of a system response value from a possible voltage vector sequence;
wherein a possible voltage vector sequence is admissible, if the corresponding trajectory is lying within bounds or the trajectory approaches bounds that are based on a reference value; and
wherein the system response value includes at least one of a predicted torque, a predicted flux, a predicted neutral point potential of the inverter, and the reference value includes at least one of a reference torque, a reference flux and a reference neutral point potential.

5. The method of claim 1, wherein step (e) comprises:
determining a harmonic distortion of a predicted torque, wherein step (f) comprises:
modifying a reference torque with the harmonic distortion of the torque, and wherein step (b) comprises:
determining admissible system response data with bounds based on the reference torque.

6. The method of claim 1, wherein step (e) comprises:
calculating a phase voltage difference sequence from a possible voltage vector sequence, and extracting a frequency information value from the phase voltage difference sequence, and wherein step (f) comprises:
damping the harmonic distortion of the electrical system by keeping in step (b) those voltage vector sequences which frequency information value is within predefined bounds.

7. The method of claim 1, wherein step (e) comprises:
determining a harmonic distortion from the predicted data by applying a digital filter to the predicted data for extracting frequency information.

8. The method of claim 1, wherein step (e) comprises:
applying a digital high pass filter to the predicated data for extracting frequency information.

9. The method of claim 1, wherein step (e) comprises:
applying a digital band pass filter to the predicted data for extracting frequency information.

10. The method of claim 1, wherein step (e) comprises:
applying a sliding discrete Fourier transformation to the predicted data for extracting frequency information.

11. The method of claim 1, wherein the frequency information extracted in step (e) at least contains frequency information of the harmonic distortion which is to be damped.

12. A program element stored on a non-transitory computer readable medium for controlling an inverter, which when being executed by at least one processor, will execute the steps of the method of claim 1.

13. A computer-readable medium according to claim 12, in combination with a computer system, and an inverter controlled by the computer system.

14. A controller for controlling an inverter, wherein the controller is adapted for executing the method of claim 1.

15. An inverter for supplying a load with an AC voltage, the inverter comprising:
an inverter circuit with switches, the inverter circuit being configured for generating an AC output voltage for at least one phase;
a filter circuit for interconnection of the inverter circuit with a load; and
a controller for controlling the switches, the controller being adapted for executing the method of claim 1, and configured for compensating harmonic distortion of the AC voltage.

16. The method of claim 2, wherein the voltage values comprise voltage values prior to current sampling times and of future sampling times predicted after the current sampling times.

17. The method of claim 16, wherein step (b) comprises:
estimating system response data by estimating a trajectory of a system response value from a possible voltage vector sequence;
wherein a possible voltage vector sequence is admissible, if the corresponding trajectory is lying within bounds or the trajectory approaches bounds that are based on a reference value; and
wherein the system response value includes at least one of a predicted torque, a predicted flux, and a predicted neutral point potential of the inverter, and the reference value includes at least one of a reference torque, a reference flux and a reference neutral point potential.

18. The method of claim 17, wherein step (e) comprises:
determining a harmonic distortion of a predicted torque, wherein step (f) comprises:
modifying a reference torque with the harmonic distortion of the torque, and wherein step (b) comprises:
determining admissible system response data with bounds based on the reference torque.

19. The method of claim 18, wherein step (e) comprises:
calculating a phase voltage difference sequence from a possible voltage vector sequence, and extracting a frequency information value from the phase voltage difference sequence, and wherein step (f) comprises:
damping the harmonic distortion of the electrical system by keeping in step (b) those voltage vector sequences which frequency information value is within predefined bounds.

20. The method of claim 19, wherein step (e) comprises:
determining a harmonic distortion from the predicted data by applying a digital filter to the predicted data for extracting frequency information.

* * * * *